(12) United States Patent
Rajagopalan et al.

(10) Patent No.: US 7,399,239 B2
(45) Date of Patent: Jul. 15, 2008

(54) USE OF ENGINEERING THERMOPLASTIC VULCANIZATES FOR GOLF BALL LAYERS

(75) Inventors: Murali Rajagopalan, South Dartmouth, MA (US); Kevin M. Harris, New Bedford, MA (US); Michael J. Sullivan, Barrington, RI (US)

(73) Assignee: Acushnet Company, Fairhaven, MA (US)

( * ) Notice: Subject to any disclaimer, the term of this patent is extended or adjusted under 35 U.S.C. 154(b) by 42 days.

(21) Appl. No.: 11/607,921

(22) Filed: Dec. 4, 2006

(65) Prior Publication Data

US 2008/0132359 A1 Jun. 5, 2008

(51) Int. Cl.
*A63B 37/00* (2006.01)

(52) U.S. Cl. .................................... 473/351
(58) Field of Classification Search .................. 473/351
See application file for complete search history.

(56) References Cited

U.S. PATENT DOCUMENTS

| | | | | |
|---|---|---|---|---|
| 3,896,078 A | 7/1975 | Hoeschele | ........... | 260/45.9 NC |
| 4,560,168 A | 12/1985 | Aoyama | ..................... | 273/232 |
| 4,925,193 A | 5/1990 | Melvin et al. | ............... | 273/232 |
| 4,960,281 A | 10/1990 | Aoyama | ..................... | 273/232 |
| 5,248,878 A | 9/1993 | Ihara | ..................... | 219/121.69 |
| 5,249,804 A | 10/1993 | Sanchez | ..................... | 273/232 |
| 5,334,673 A | 8/1994 | Wu | ......................... | 273/235 R |
| 5,484,870 A | 1/1996 | Wu | .............................. | 528/28 |
| 5,562,552 A | 10/1996 | Thurman | ..................... | 473/379 |
| 5,575,477 A | 11/1996 | Hwang | ........................ | 473/379 |
| 5,688,191 A | 11/1997 | Cavallaro et al. | ............ | 473/373 |
| 5,692,974 A | 12/1997 | Wu et al. | ..................... | 473/377 |
| 5,713,801 A | 2/1998 | Aoyama | ..................... | 473/354 |
| 5,803,831 A | 9/1998 | Sullivan et al. | ............. | 473/374 |
| 5,816,943 A | 10/1998 | Masutani et al. | ............ | 473/365 |
| 5,820,488 A | 10/1998 | Sullivan et al. | ............. | 473/374 |
| 5,849,168 A | 12/1998 | Lutz | ........................... | 264/755 |
| 5,885,172 A | 3/1999 | Hebert et al. | ............... | 473/354 |
| 5,899,818 A | 5/1999 | Zider et al. | ................. | 473/324 |
| 5,908,358 A | 6/1999 | Wu | ............................. | 473/378 |
| 5,915,373 A | 6/1999 | Malover et al. | ........ | 126/263.02 |
| 5,919,100 A | 7/1999 | Boehm et al. | ............... | 473/354 |
| 5,957,787 A | 9/1999 | Hwang | ........................ | 473/379 |
| 5,965,669 A | 10/1999 | Cavallaro et al. | ............ | 525/221 |
| 5,981,654 A * | 11/1999 | Rajagopalan | ................. | 525/66 |
| 5,981,658 A | 11/1999 | Rajagopalan et al. | ......... | 525/72 |
| 6,056,842 A | 5/2000 | Dalton et al. | ................ | 156/243 |
| 6,075,223 A | 6/2000 | Harrison | ................ | 219/121.85 |
| 6,099,415 A | 8/2000 | Lutz | ............................ | 473/357 |
| 6,149,535 A | 11/2000 | Bissonnette et al. | .......... | 473/354 |
| 6,180,040 B1 | 1/2001 | Ladd et al. | ................... | 264/248 |
| 6,180,722 B1 | 1/2001 | Dalton et al. | ............... | 525/193 |
| 6,207,784 B1 | 3/2001 | Rajagopalan | ................. | 528/71 |

(Continued)

OTHER PUBLICATIONS

U.S. Appl. No. 10/167,744, filed Jun. 13, 2002 entitled "Golf Ball with Multiple Cover Layers".

(Continued)

*Primary Examiner*—Raeann Trimiew
(74) *Attorney, Agent, or Firm*—Hanify & King, P.C.

(57) ABSTRACT

Golf balls with at least one component, e.g., golf ball covers, cores, and intermediate layers, formed from engineering thermoplastic vulcanizates ("ETPV") that have improved heat resistance, abrasion resistance, and impact strength.

19 Claims, 2 Drawing Sheets

U.S. PATENT DOCUMENTS

| | | | |
|---|---|---|---|
| 6,213,898 B1 | 4/2001 | Ogg | 473/383 |
| 6,241,622 B1 | 6/2001 | Gobush et al. | 473/199 |
| 6,248,804 B1 | 6/2001 | Lutz | 523/160 |
| 6,286,364 B1 | 9/2001 | Aoyama et al. | 73/65.03 |
| 6,290,615 B1 | 9/2001 | Ogg | 473/378 |
| 6,315,915 B1 | 11/2001 | Hebert et al. | 216/67 |
| 6,338,684 B1 | 1/2002 | Winfield et al. | 473/378 |
| 6,358,161 B1 | 3/2002 | Aoyama | 473/383 |
| 6,369,125 B1 | 4/2002 | Nesbitt | 522/142 |
| 6,383,092 B1 | 5/2002 | Ogg | 473/378 |
| 6,409,615 B1 | 6/2002 | McGuire et al. | 473/383 |
| 6,458,307 B2 | 10/2002 | Inoue et al. | 264/232 |
| 6,462,303 B1 | 10/2002 | Brown | 219/121.69 |
| 6,488,591 B1 | 12/2002 | Gobush et al. | 473/199 |
| 6,494,795 B2 | 12/2002 | Sullivan | 473/372 |
| 6,500,073 B1 | 12/2002 | Gobush et al. | 473/199 |
| 6,500,495 B2 | 12/2002 | Lutz | 427/500 |
| 7,244,790 B2 * | 7/2007 | Sunkara et al. | 525/327.4 |
| 2001/0005699 A1 | 6/2001 | Morgan et al. | |
| 2001/0009310 A1 | 7/2001 | Hebert et al. | |
| 2001/0018375 A1 | 8/2001 | Hayashi et al. | |
| 2001/0019971 A1 | 9/2001 | Hayashi et al. | |
| 2002/0025862 A1 | 2/2002 | Sullivan et al. | |
| 2002/0028885 A1 | 3/2002 | Sullivan et al. | |
| 2002/0082358 A1 | 6/2002 | Ohira et al. | |
| 2002/0151380 A1 | 10/2002 | Sullivan | |
| 2003/0078348 A1 | 4/2003 | Rajagopalan et al. | |
| 2003/0096936 A1 | 5/2003 | Wu et al. | |
| 2003/0106442 A1 | 6/2003 | Gosetti | |
| 2003/0109329 A1 | 6/2003 | Kennedy, III | |
| 2003/0114255 A1 | 6/2003 | Dalton et al. | |
| 2003/0119989 A1 | 6/2003 | Ladd et al. | |
| 2003/0158001 A1 | 8/2003 | Morgan et al. | |
| 2003/0212240 A1 | 11/2003 | Wu et al. | |
| 2004/0115450 A1 | 6/2004 | Bendler et al. | |

OTHER PUBLICATIONS

Plastics News, Sep. 6, 2004, Bill Bregar, "New Resin, Applications on DuPont Agenda."

* cited by examiner

USE OF ENGINEERING THERMOPLASTIC VULCANIZATES FOR GOLF BALL LAYERS

FIELD OF THE INVENTION

The present invention relates generally to golf balls and more specifically, to golf balls with at least one component, e.g., golf ball covers, cores, and intermediate layers, formed from engineering thermoplastic vulcanizates ("ETPV") that have improved heat resistance, abrasion resistance, and impact strength.

BACKGROUND OF THE INVENTION

While the U.S.G.A. regulates five specifications for the purposes of maintaining golf ball consistency, golf ball manufacturers constantly strive to improve alternative characteristics of the ball (i.e., spin, feel, durability, distance, sound, visibility, etc.). This is typically accomplished by altering the type of materials utilized and/or improving construction of the balls. For example, the proper choice of the materials for the cover(s) and core(s) are important in achieving certain distance, durability, and playability properties, including resilience and compression. Other important factors controlling golf ball performance include, but are not limited to, cover thickness and hardness, core stiffness (typically measured as compression), ball size, and surface configuration.

In fact, one of the principal properties driving performance of a golf ball is resilience. Resilience is generally defined as the ability of a strained body, by virtue of high yield strength and low elastic modulus, to recover its size and form following deformation. Simply stated, resilience is a measure of energy retained to the energy lost when the ball is impacted with the club. Golf balls function partly as a result of their ability to transfer kinetic energy of a moving golf club head to the golf ball and this ability is directly related to the modulus of elasticity of the various polymeric compounds that make up the components of the golf ball (in addition to the material properties of the golf club). However, because the modulus of elasticity varies with temperature, high and low temperatures will typically effect the performance of the golf ball. The coefficient of restitution (COR), which is the ratio of the outbound or rebound velocity to the incoming or inbound velocity, may be used, at least in part, as an indicator of performance at various temperatures.

For practical purposes, the optimum temperature for maximum driving distance and a "soft" feel is about 59° F. to about 95° F. Depending on the season and the climate, golf balls can be well below this optimum temperature range. Generally, the higher the temperature within a given range, the higher the modulus of elasticity, and, conversely, the lower the temperature, the lower the modulus of elasticity. In other words, as the temperature drops, golf balls generally become stiff and usually cannot be driven as far as when they are warm. In fact, golf balls stored in an unheated area may have a ball temperature of 32° F. or less, which may have a dramatic effect on the driving distance and feel of the golf ball.

One way to avoid playing with a golf ball that has a temperature outside of the optimum range is to manufacture the golf ball with a qualitative temperature indicator. Examples of golf balls having such temperature indicators are disclosed in U.S. Patent Publication No. 2003/0109329. Another way to compensate for non-optimum ball temperatures is to use a portable golf ball warmer, such as the one disclosed in U.S. Pat. No. 5,915,373. Still another attempt at reducing the effect of non-optimal temperatures on driving distance and golf ball feel is to use a golf club that compensates for various changes in stiffness of a golf ball. U.S. Pat. No. 5,899,818 discloses a golf club head having temperature-variable impact properties using a shape memory alloy that becomes stiffer at higher temperatures and more elastic at lower playing temperatures. While these methods allow a player to use a golf ball in non-optimal playing conditions and may allow the golfer to achieve adequate distance, they require special equipment to do so. And, because COR is generally a function of the composition of the components of the golf ball, it would be advantageous to find a particular material or blend of materials that provides desirable COR and, thus, desirable performance at non-optimal temperatures.

In addition, as indicated above, compression is another important property involved in the overall performance of a golf ball. The compression of a ball will influence the sound or "click" produced when the ball is properly hit. Similarly, compression can effect the "feel" of the ball (i.e., hard or soft responsive feel), particularly in chipping and putting. Moreover, while compression of itself has little bearing on the distance performance of a ball, compression can affect the playability of the ball on striking.

The degree of compression of a ball against the club face and the softness of the cover strongly influences the resultant spin rate. For example, a softer cover will typically produce a higher spin rate than a harder cover whereas a harder core will produce a higher spin rate than a softer core because, at impact, a hard core serves to compress the cover of the ball against the face of the club to a much greater degree than a soft core. In contrast, when a softer core is used, the cover is under much less compressive stress than when a harder core is used resulting in less intimate contact with the clubface and lower spin rates. Thus, it would be advantageous to find the right combination of materials for use in a golf ball to deliver optimal compression.

Furthermore, cover hardness and thickness are important in producing the distance, playability and durability properties of a golf ball. As mentioned above, cover hardness directly affects the resilience and thus distance characteristics of a ball. All things being equal, harder covers produce higher resilience. This is because soft materials detract from resilience by absorbing some of the impact energy as the material is compressed on striking. Therefore, it would be advantageous to also achieve an optimal combination of layer hardness and thickness for use in golf balls.

For example, ionomeric resins have been used to achieve durability in golf balls. However, some of the advantages gained in increased durability have been offset to some degree by decreases in playability due to the hardness of the material. As a result, a great deal of research continues in order to develop golf ball components exhibiting not only the improved impact resistance and carrying distance properties produced by the "hard" ionomeric resins, but also the playability (i.e., "spin", "feel", etc.) characteristics previously associated with the "soft" balata covers, properties still desired by the more skilled golfer. In addition, various golf ball compositions with purported improved light stability and durability have been disclosed. For example, U.S. Pat. No. 6,458,307 is directed to thermoplastic cover materials with a reported improvement in light stability, cut resistance, and abrasion resistance. U.S. Pat. No. 6,369,125 relates to crosslinkable thermoplastic compositions that can be melted and reformed and also have improved scuff and cut resistance over conventional balata covers. However, like ionomeric resins, these materials have fallen short in several respects in achieving optimal performance characteristics.

In addition to the properties discussed above, there remains a need in the art to overcome the deficiencies of prior art materials with respect to degradation at elevated temperatures. For example, wrinkling of the golf ball component may occur at about 50° C. In fact, even the most advanced light stable polyurethane and polyurea compositions have been shown to be susceptible to heat degradation during additional processing steps, e.g., coating and marking, and upon storage in non-optimal temperatures. Several manufacturers have attempted to compensate for any golf ball cover degradation upon application of heat by using coatings having contraction and expansion properties. For example, U.S. Pat. No. 5,816,943 is directed to a coating having a higher heat resistance than the cover material to prevent shallowing of dimples or dulling of dimple edges upon the coating application. However, these efforts obviously require an additional step or processing time.

In sum, while past efforts by manufacturers compensate for many problems associated with golf play during non-optimal conditions, no method of material has addressed all of the problems at once. In addition, most of the methods used to compensate for extreme temperature conditions involve the use of a special indicator, club, or warmer. Therefore, there remains a continuing need for novel compositions that solve temperature-related problems of conventionally-formed golf balls and golf clubs, e.g., resiliency and material degradation at non-optimal temperatures. In particular, it would be advantageous to provide a composition using materials that provides heat resistance and impact strength, as well as improved resiliency, to golf ball and club components formed therefrom.

SUMMARY OF THE INVENTION

The present invention is directed to a golf ball including at least one layer formed of a composition including (a) a blend including: thermoplastic component including a polyalkylene phthalate polyester polymer, polyalkylene phthalate polyester copolymer, or mixture thereof; and a rubber component including a crosslinkable polyacrylate vulcanizate rubber, a polyethylene acrylate vulcanizate rubber, polymethacrylate vulcanizate rubber, a polyethylene methacrylate vulcanizate rubber or a combination thereof, (b) a free radical initiator; and (c) a coagent including an organic diene.

In one embodiment, the thermoplastic component includes a polyalkylene phthalate polyester copolymer including a polyether polyester having at least one segment of polybutylene terephthalate and at least one segment of long chain polyether glycols. In another embodiment, the thermoplastic component is selected from the group consisting of polyalkylene terephthalate, polyether ester of polyalkylene terephthalate, polyalkylene terephthalate copolymer, polyether ester of polyalkylene terephthalate copolymer, and mixtures thereof.

The organic diene of the coagent may include diethylene glycol diacrylate, diethylene glycol dimethacrylate, N,N'-m-phenylene dimaleimide, triallylisocyanurate, trimethylolpropane trimethacrylate, tetraallyloxyethane, triallylisocyanurate, tetramethylene diacrylate, polyethylene glycol dimethacrylate, or mixtures thereof.

In one embodiment, the free radical initiator includes 2,5-dimethyl-2,5-di-(t-butylperoxy) hexyne-3, t-butyl peroxybenzoate, 2,5-dimethyl-2,5-di-(t-butylperoxy)-2,5-dimethylhexane, dicumyl peroxide, a,a-bis(t-butylperoxy)-2,5-dimethylhexane, and mixtures thereof.

Regarding the various amounts of the components in the composition, in one embodiment, the thermoplastic component is present in an amount of about 15 to about 65 weight percent of the blend. In another embodiment, the rubber component is present in an amount of about 35 to 85 weight percent of the blend.

The composition may be present in any layer of the golf ball. In one embodiment, the golf ball includes a core, a cover layer, and an intermediate layer disposed between the core and the cover, and wherein the intermediate layer includes the composition.

The present invention also relates to a golf ball including a core, a cover, and an intermediate layer disposed between the core and the cover, wherein the intermediate layer is formed of a first composition including: (a) a blend including: (i) about 15 to 65 percent by weight of the blend of a thermoplastic component including a polyalkylene phthalate polyester polymer, polyalkylene phthalate polyester copolymer, or mixture thereof; and (ii) about 35 to 85 percent by weight of the blend of a rubber component including a polyacrylate elastomer, a polyethylene acrylate elastomer, a polymethacrylate elastomer, a polyethylene methacrylate elastomer or a mixture thereof, (b) a curative including a free radical initiator and a coagent, wherein the cover is formed of a second composition including polyurethane linkages, polyurea linkages, or a combination thereof.

In this aspect of the invention, the second composition may consist of only urea linkages. And, in one embodiment, the thermoplastic component is present in an amount of about 20 to 60 percent by weight of the blend and the rubber component is present in an amount of about 40 percent to 80 percent by weight of the blend.

The coagent may include an organic diene. In one embodiment, the organic diene is selected from the group consisting of diethylene glycol diacrylate, diethylene glycol dimethacrylate, N,N'-m-phenylene dimaleimide, triallylisocyanurate, trimethylolpropane trimethacrylate, tetraallyloxyethane, triallylisocyanurate, tetramethylene diacrylate, polyethylene glycol dimethacrylate, and mixtures thereof. In another embodiment, the first composition has a hardness of about 55 Shore A to 60 Shore D.

The present invention is also directed to a method of making a golf ball including the steps of (a) forming a core; (b) forming an intermediate layer disposed about the core by (i) forming a blend including a thermoplastic component including a polyalkylene phthalate polyester polymer, polyalkylene phthalate polyester copolymer, or mixture thereof with a rubber component including a crosslinkable polyacrylate vulcanizate rubber, a polyethylene acrylate vulcanizate rubber, polymethacrylate vulcanizate rubber, a polyethylene methacrylate vulcanizate rubber or a combination thereof, (ii) forming a curative including a free radical initiator and a coagent including an organic diene; (iii) mixing the blend and curative to a composition; and (iv) forming the composition into an intermediate layer; and (c) forming a cover disposed about the intermediate layer.

In one embodiment, the step of forming the intermediate layer includes extruding the composition. In another embodiment, the step of forming the intermediate layer includes injection molding the composition.

In this aspect of the invention, the molding temperature may range from about 45° C. to 65° C. In addition, the melt temperature may be from about 240° C. to 260° C.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

Figure 1:
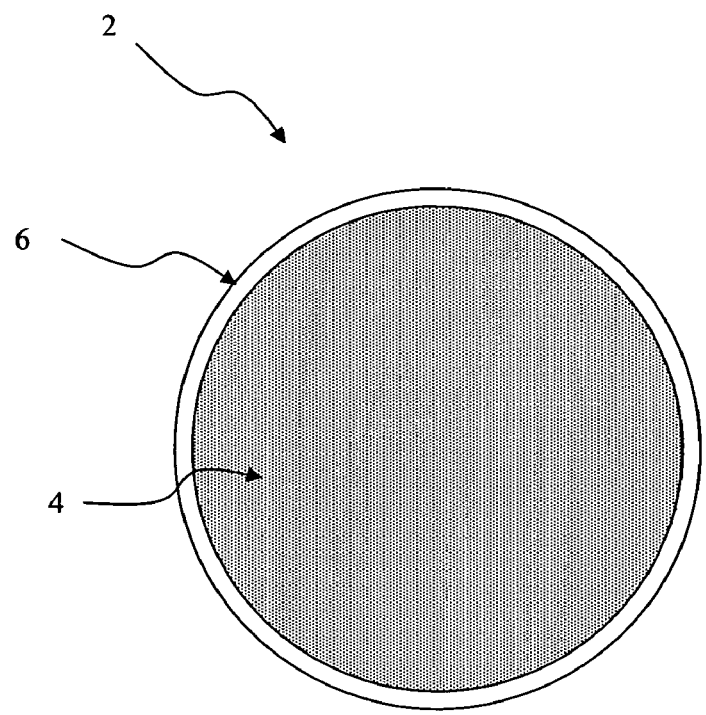
FIG. 1 is a cross-sectional view of a two layer ball, wherein at least a portion of the golf ball is formed from the composition of the invention.

The present invention contemplates compositions for golf balls and golf clubs that overcome temperature-related and degradation-related problems associated with ball and club components formed from known compositions. In particular, the compositions of the invention are formed using engineering thermoplastic vulcanizates ("ETPV").

The compositions of the invention may be used in a variety of golf ball constructions, e.g., one-piece, two-piece, or multilayer balls, as well as golf club components, e.g., club head inserts, and other golf related articles, such as well as other golf equipment components, such as shoe inserts. When used to form various golf ball components, e.g., golf ball covers, the compositions of the invention produce golf balls with a unique combination of improved mechanical strength, heat resistance, and elastomeric qualities, as well as other improved physical properties.

COMPOSITIONS OF THE INVENTION

The compositions of the invention include ETPV, which provide an optimal combination of a thermoplastic matrix and an elastomer phase. In particular, ETPV are high performance cross-linked elastomers dispersed in a high performance thermoplastic engineering matrix. For example, the compositions of the invention may include a mixture of a thermoplastic component and a vulcanized rubber. In one embodiment, the composition further includes a curative.

Suitable thermoplastic components include, but are not limited to, polyalkylene phthalate polyester polymers, copolymers, and block copolymers, thermoplastic block elastomers, and mixtures thereof. In one embodiment, the thermoplastic component is a block copolymer such as a block copolymer of ether-amide, ester-amide, ether-urethane, ester-urethane, ether-urea, ester-urea, or a mixture thereof.

In another embodiment, the thermoplastic component is a copolymer that includes one or more dicarboxylic acids or their equivalents (their esters or ester forming derivatives such as acid chlorides, anhydrides, etc), one or more linear long chain glycols, and one or more low molecular weight glycols. The dicarboxylic acid used in the present invention may be aromatic, aliphatic, or cycloaliphatic. Non-limiting examples of an aromatic dicarboxylic acid suitable for use in this aspect of the invention include terephthalic acid and isophthalic acid, dibenzoic acid, bis(p-carboxyphenyl)methane, p-oxy(p-carboxyphenyl)benzoic acid, napthalene or anthralene dicarboxylic acid, 4,4'-sulfonyl dibenzoic acid, and mixtures thereof. In addition, hydroxy benzoic acid may be used.

Representative aliphatic and cycloaliphatic acids suitable for use in this aspect of the invention include, but are not limited to, sebacic acid, 1, 3 or 1,4-cylcohexane dicarboxylic acid, adipic acid, glutaric acid, succinic acid, carbonic acid, oxalic acid, itaconic acid, azelaic acid, diethylmalonic acid, fumaric acid, citraconic acid, allylmalonate acid, 4-cyclohexene-1,2-dicarboxylate acid, pimelic acid, suberic acid, 2,5-diethyladipic acid, 2-ethylsuccinic acid, cyclopentane dicarboxylic acid, 2,2,3,3 tetramethyl succinic acid, decahydro-1, 5-(or 2,6-) naphthylene dicarboxylic acid, 4,4'-bicyclohexyl dicarboxylic acid, 4,4'-methylenebis(cyclohexyl carboxylic acid), 3,4-furan dicarboxylate, 1,1-cyclobutane dicarboxylate, and mixtures thereof.

The long chain glycols suitable for use in this aspect of the invention have a weight average molecular weight of about 600 to 6000 and include, but are not limited to, poly(alkylene oxide) glycols, poly(1,2 and 1,3 propylene oxide) glycol, poly(tetramethylene or pentamethylene or hexamethylene or heptamethylene or octamethylene oxide) glycol, random or block copolymers of ethylene oxide and 1,2-propylene oxide, poly-formals prepared by reacting formaldehyde with glycols, and mixtures thereof.

Suitable low molecular weight diols for use in this aspect of the invention include, but are not limited to, diols with 2 to 15 carbon atoms such as ethylene, propylene, isobutylene, tetramethylene, pentamethylene, hexamethylene and decamethylene glycols, dihydroxy cylcohexane, cyclohexane dimethanol, resorcinol, hydroquinone, 1,5 dihydroxy napthalene, and mixtures thereof.

A skilled artisan would be aware of methods for forming a suitable thermoplastic component of the invention. For example, a polyalkylene phthalate polyester polymer according to the invention may be prepared by polymerizing one or more isomers of phthalic acid, phthalic anhydrides, or corresponding esters with one or more comonomer diols. In one embodiment, the phthalate isomer is terephthalate and the diol is ethylene glycol, 1,4-butane diol, or a mixture thereof. In particular, suitable thermoplastic components may include polyalkylene terephthalate, polyether ester of polyalkylene terephthalate, and mixtures thereof.

Likewise, a polyalkylene phthalate polyester copolymer may be formed by polymerizing the polyalkylene phthalate polyester polymer various comonomers including, but not limited to, dicarboxylic acids, dicarboxylic acid anhydrides, esters of dicarboxylic acid anhydrides, diols, lactones, and mixtures thereof. Such copolymers may be random copolymers of block copolymers of PET or PBT. In one embodiment, a suitable polyalkylene phthalate polyester copolymer for use with the present invention is a polyether polyester having at least one segment of polybutylene terephthalate and at least one segment of long chain polyether glycols. In particular, suitable thermoplastic components may include polyalkylene terephthalate copolymer, polyether ester of polyalkylene terephthalate copolymer, and mixtures thereof.

The thermoplastic component of the invention is preferably included in an amount of about 10 to about 75 weight percent of the blend, more preferably about 15 to about 65 weight percent of the blend, and even more preferably about 20 to about 60 weight percent of the blend.

Suitable vulcanized rubbers for use with the present invention include, but are not limited to, acrylate rubbers such as crosslinkable poly(meth)acrylate or polyethylene/(meth)acrylate vulcanizates, nitrile rubbers, silicone rubbers, epichlorohydrin rubbers, chlorinated polyethylene, polyisoprene rubber, styrene butadiene rubber, polybutadiene rubber, butyl and halobutyl rubber, ethylene propylene or ethylene propylene diene rubber, fluorocarbon rubbers, melt processable polyurethane gum rubbers, fluorosilicone elastomers, ethyl alkyl acrylate acid acrylic acid copolymer rubber (Vamac®), polyphosphazene elastomers, polysulfide elastomers, and mixtures thereof. A skilled artisan would be aware of methods for forming a suitable vulcanized rubber for use with the present invention. For example, a vulcanizate for use with the present invention may be formed by copolymerizing more than one acrylic acid ester, methacrylic acid ester, or mixtures thereof to form poly(meth)acrylate copolymers.

In one embodiment, a suitable vulcanizate may be formed by copolymerizing ethylene and one or more alkyl esters of acrylic acid, methacrylic acid, or mixtures thereof to form polyethylene/(meth)acrylate copolymers. For example, a suitable vulcanizate according to the invention is a copolymer of ethylene and alkyl acrylate. In such an embodiment, the acrylate may included in an amount no less than about 6.5 mole percent. In an alternate embodiment, the acrylate is present in the vulcanizate in an amount of about 15 mole percent or greater, preferably about 20 mole percent or greater, and more preferably an amount of about 25 mole percent or greater. In another embodiment, ethylene is present in an amount of less than about 70 percent, preferably less than about 60 percent, and more preferably less than about 50 percent by weight of the copolymer. In yet another embodiment, the acrylic acid ester is present in the copolymer in an amount of about 30 percent or greater, preferably about 40 percent or greater, and more preferably about 50 percent or greater.

Other types of vulcanizates suitable for use with the present invention include, but are not limited to, polyperfluoroalkyl acrylate type vulcanizates based on monomers such as 1,1-dihydroperfluoro-n-butyl acrylate and fluorinated copolymers derived from vinylidene fluoride and hexafluoropropylene. Additional examples of such materials are disclosed in U.S. patent application Ser. No. 10/674,305, which is incorporated in its entirety by reference herein.

The vulcanizate rubber is preferably present in the blend in an amount of about 25 to about 90 weight percent of the blend, about 35 to 85 weight percent of the blend, and even more preferably about 40 percent to about 80 percent of the blend.

The vulcanized rubber may or may not be a functionalized polymer. For example, in one embodiment, the vulcanized rubber includes a functionalized termonomer. However, when the vulcanized rubber does not include functional groups (or includes relatively small amounts of functionalized termonomer), the compositions of the invention may include a curative. In particular, because the vulcanizate discussed above is essentially a linear copolymer, it is capable of crosslinking in situ with the curative. Without being bound by any particular, theory, the use of a curative may lead to better control of the polymer morphology and physical properties of the resultant composition and, thus, better reproducibility of the composition.

Suitable curatives according to the invention preferably include an organic peroxide free-radical initiator and a coagent. For example, the free radical initiator may be any initiator that readily decomposes at the crosslinking temperature, but not at the melting temperature of the thermoplastic component and the vulcanizate. Nonlimiting examples of free-radical initiators suitable for use with the present invention include 2,5-dimethyl-2,5-di-(t-butylperoxy) hexyne-3, t-butyl peroxybenzoate, 2,5-dimethyl-2,5-di-(t-butylperoxy)-2,5-dimethylhexane, dicumyl peroxide, a,a-bis(t-butylperoxy)-2,5-dimethylhexane, and mixtures thereof.

The coagent is preferably an organic diene. For example, the coagent may be diethylene glycol diacrylate, diethylene glycol dimethacrylate, N,N'-m-phenylene dimaleimide, triallylisocyanurate, trimethylolpropane trimethacrylate, tetraallyloxyethane, triallylisocyanurate, tetramethylene diacrylate, polyethylene glycol dimethacrylate, and mixtures thereof. Additional coagents suitable for use with the present invention include, but are not limited to, difunctional or trifunctional di(meth)acrylate, triallyl cyanurate, triallyl isocyanurate, metallic monomers such as zinc diacrylate or zinc dimethacrylate, polybutadiene diacrylate or polybutadiene dimethacrylate, liquid polymers such as high vinyl low molecular weight polybutadiene and styrene butadiene copolymer, and mixtures thereof.

Additional materials other than the main components discussed above may be added to the compositions of the invention including, but not limited to, coloring agents or dyes, optical brighteners, crosslinking agents, whitening agents such as $TiO_2$ and ZnO, UV absorbers, hindered amine light stabilizers, defoaming agents, processing aids, softening agents, plasticizers, surfactants, impact modifiers, fillers, reinforcing materials, catalysts, compatibilizers, fragrance components, antioxidants and other conventional additives. Those of ordinary skill in the art are aware of the purpose of these additives and the amounts that should be employed to fulfill those purposes.

For example, fillers may be added to the compositions of the invention to affect rheological and mixing properties, the specific gravity (i.e., density-modifying fillers), the modulus, the tear strength, reinforcement, and the like. The fillers are generally inorganic, and suitable fillers include numerous metals, metal oxides and salts, such as zinc oxide and tin oxide, as well as barium sulfate, zinc sulfate, calcium carbonate, zinc carbonate, barium carbonate, clay, tungsten, tungsten carbide, an array of silicas, regrind (recycled core material typically ground to about 30 mesh particle), high-Mooney-viscosity rubber regrind (having a Mooney viscosity of about 55 or greater), and mixtures thereof.

In addition, the compositions of the invention may contain at least one light stabilizing component. As used herein, light stabilizer may be understood to include hindered amine light stabilizers, ultraviolet (UV) absorbers, and antioxidants. Addition of UV absorbers and light stabilizers to any of the above compositions may help to maintain the tensile strength, elongation, and color stability, as well as prevent cover surface fractures due to photodegredation. Suitable light stabilizers include, but are not limited to, TINUVIN® 292, TINUVIN® 328, TINUVIN® 213, TINUVIN® 765, TINUVIN® 770 and TINUVIN® 622. TINUVIN® products are available from Ciba Specialty Chemicals of Tarrytown, N.Y.

Moreover, as discussed above, dyes, as well as optical brighteners and fluorescent pigments may also be included in the golf ball covers produced with polymers formed according to the present invention. Such additional ingredients may be added in any amounts that will achieve their desired purpose. For example, a white dispersion may used in the compositions of the invention, preferably in an amount of about 0.5 percent to about 10 percent by weight of the composition. In one embodiment, the composition of the invention includes about 2 percent to about 8 percent of white dispersion by weight of the composition. In another embodiment, the white dispersion is present in the composition in an amount of about 3 percent to about 6 percent by weight of the composition. In still another embodiment, the white dispersion is present in the composition in an amount of about 3.5 percent to about 5 percent by weight of the composition.

Furthermore, a stabilizing component may be included that is a combination of polyamide and antioxidant. For example, U.S. Pat. No. 3,896,078 discloses a suitable stabilizer for use in the compositions of the invention, the entire disclosure of which is incorporated by reference herein. In particular, such a stabilizing component may be included in the composition in amounts providing up to about 6.5 percent of amide linkages by weight of the composition.

Methods of Forming the Composition

The compositions of the invention may be formed in a variety of ways including, but not limited to, injection molding, extrusion, and the like. Depending on the method of formation of the composition, the processing temperatures may vary. For example, when the compositions of the invention are formed via injection molding, the molding temperature is preferably about 35° C. to about 75° C., preferably about 45° C. to about 65° C., and even more preferably about 48° C. to about 52° C. In one embodiment, the mold temperature is about 50° C. In another embodiment, the mold temperature is about 30° C. to about 60° C., preferably about 35° C. to about 50° C., and more preferably about 35° C. to about 45° C. The melt temperature may range from about 230° C. to about 275° C., preferably about 240° C. to about 260° C., and more preferably about 245° C. to about 255° C.

As generally mentioned above, the compositions of the invention may also be formed through an extrusion process. When the compositions of the invention are formed via extrusion, the melt temperature of the compositions preferably range from about 175° C. to about 275° C., preferably about 200° C. to about 250° C., and more preferably about 205° C. to about 240° C. For instance, a suitable melt temperature for the compositions of the invention when preparing via extrusion can range from about 215° C. to about 230° C. Any type of extruder may be used to form the compositions of the invention provided the equipment provides a constant delivery of homogeneous melt of uniform temperature. In one embodiment, the extruder is a single screw extruder.

One of the benefits of the compositions of the invention is that the components have a slow rate of cure at low temperatures thus enabling significant mixing and dispersion of the vulcanizate in the thermoplastic matrix prior to crosslinking. In particular, the thermoplastic component and vulcanizate are mixed and a high level of dispersion is achieved prior to increasing the temperature to enable crosslinking. This high level of dispersion of the rubber phase increases heat and impact resistance and allows optimization of properties. Because the resulting composition is thermoplastic, the composition is melt processable, thermoformable, and recyclable. In particular, the resultant composition has the advantageous benefit that it is more thermoplastic as compared to the rubber alone and more elastic than the thermoplastic component alone.

In one embodiment, the ETPV are provided in pellet form and are suitable for processing by standard thermoplastic methods. For example, the pellet moisture content is preferably less than about 0.1 percent. In one embodiment, the pellet moisture content is not greater than about 0.08 percent. In another embodiment, the pellet moisture content is not greater than about 0.05 percent. In particular, when the compositions of the invention are formed via injection molding, the maximum moisture content is preferably not greater than about 0.1 percent. And, when extrusion is used to form the compositions of the invention, the moisture content is preferably about 0.05 percent or less, more preferably about 0.4 percent or less, and even more preferably about 0.3 percent or less.

Those of ordinary skill in the art would be aware of the methods for forming a pellet and drying the resulting pellet. For example, virgin polymer should be dried for about two to three hours at about 80° C. in a suitable dryer to a moisture content within the ranges discussed above.

Composition Properties

The compositions of the invention can preferably withstand temperatures of up to about 180° C., which is much higher than conventional thermoplastic elastomers. In one embodiment, a composition of the invention preferably has a heat resistance of up to about 170° C. In another embodiment, a composition of the invention has a heat resistance of up to about 160° C.

In addition, the mechanical resistance of the compositions of the invention is improved over conventional thermoplastic elastomers. For example, the mechanical stress at break at −25° C. is preferably at least about 3 kpsi, more preferably at least about 3.25 kpsi, and even more preferably at least about 3.5 kpsi. The mechanical stress at break is tested based on ISO 527. In another embodiment, the mechanical stress at break at 23° C. is preferably at least about 0.5 kpsi, more preferably at least about 0.75 kpsi, and even more preferably at least about 0.85 kpsi. In another embodiment, the mechanical stress at break at 23° C. is about 0.87 kpsi or greater.

The mechanical stress at break at 100° C. is preferably at least about 0.1 kpsi, more preferably at least about 0.15 kpsi, and even more preferably at least about 0.20 kpsi. In one embodiment, the mechanical stress at break at 23° C. is about 0.24 kpsi or greater. The improved mechanical stress is also realized at temperatures of 150° C. and higher. For example, the mechanical stress at break at 150° C. or higher is preferably about 0.125 kpsi or higher, more preferably about 0.135 kpsi or higher, and even more preferably about 0.145 or higher.

Likewise, the tensile stress of the compositions of the invention is improved over conventional thermoplastic elastomers. For example, the tensile stress at −25° C. at 10 percent/100 percent strain is about 1.25/2.25 kpsi or greater, preferably about 1.35/2.50 kpsi or greater, and more preferably about 1.45/2.75 kpsi or greater, as measured according to ISO 527. In one embodiment, the tensile stress at 23° C. at 10 percent/100 percent strain is about 0.125/0.25 kpsi or greater, preferably about 0.135/0.50 kpsi or greater, and more preferably about 0.145/0.70 kpsi or greater. In another embodiment, the tensile stress at 100° C. at 10 percent strain is about 0.025 kpsi or greater, preferably about 0.045 kpsi or greater, and more preferably about 0.07 or greater. In yet another embodiment, the tensile stress at 150° C. is about 0.01 kpsi or greater, preferably about 0.025 kpsi or greater, and more preferably about 0.04 kpsi or greater.

The flexural modulus of the compositions of the invention is preferably about 2.0 kpsi or greater at 20° C. as measured according to ISO 178, preferably about 2.75 kpsi or greater, even more preferably about 3.25 kpsi or greater. In one embodiment, the flexural modulus of the compositions of the invention is about 3.5 kpsi or greater at 20° C., preferably about 3.6 kpsi or greater. In another embodiment, the flexural modulus is about 1.5 kpsi or greater at 23° C. or greater, preferably about 1.75 kpsi or greater, and more preferably about 1.9 or greater.

The composition has a material hardness of about 50 Shore A to about 60 Shore D. In one embodiment, the hardness of the material is about 55 Shore A to about 45 Shore D (95 Shore A). In another embodiment, the hardness of the material is about 55 Shore A to about 75 Shore A). In another embodiment, the Shore A hardness is about 58 Shore A to about 68 Shore A.

The specific gravity of the compositions of the invention may range from about 0.9 to about 1.4, preferably about 1.0 to about 1.3, and more preferably about 1.1 to about 1.25.

Composition Blends

The compositions of the invention may be blended with other conventional materials. For example, in one embodiment, the composition contains about 10 percent to about 90 percent of the composition of the invention, preferably from about 10 percent to about 75 percent, and contains about 90 percent to 10 percent, more preferably from about 90 percent to about 25 percent other polymers and/or other materials as described below. Unless otherwise stated herein, all percentages are given in percent by weight of the total composition of the golf ball layer in question.

Other polymeric materials suitable for blending with the compositions of the invention include castable thermoplastics, cationic and anionic urethane ionomers (as disclosed in U.S. Pat. No. 5,692,974) and urethane epoxies (as disclosed in U.S. Pat. No. 5,908,358), polyurethane ionomers, polyurea ionomers (as disclosed in U.S. Pat. No. 5,484,870), epoxy resins, polyethylenes, polyamides and polyesters, polycarbonates, polyacrylin, siloxanes and epoxy resins or their blends, and mixtures thereof. One of ordinary skill in the art would be well aware of methods to blend the polymeric materials with the composition of the invention. The disclosures of the above patents are incorporated herein by reference in their entirety.

Golf Ball Construction

The compositions of the present invention may be used with any type of ball construction. For example, one-piece, two-piece, three-piece, and four-piece golf ball designs are contemplated by the present invention. In addition, golf balls having double cores, intermediate layer(s), and/or double covers are also useful with the present invention. As known to those of ordinary skill in the art, the type of golf ball constructed, i.e., double core, double cover, and the like, depends on the type of performance desired of the ball. As used herein, the term "layer" includes any generally spherical portion of a golf ball, i.e., a golf ball core or center, an intermediate layer, and/or a golf ball cover. As used herein, the term "inner layer" refers to any golf ball layer beneath the outermost structural layer of the golf ball. As used herein, "structural layer" does not include a coating layer, top coat, paint layer, or the like. As used herein, the term "multilayer" means at least two layers.

Figure 2:
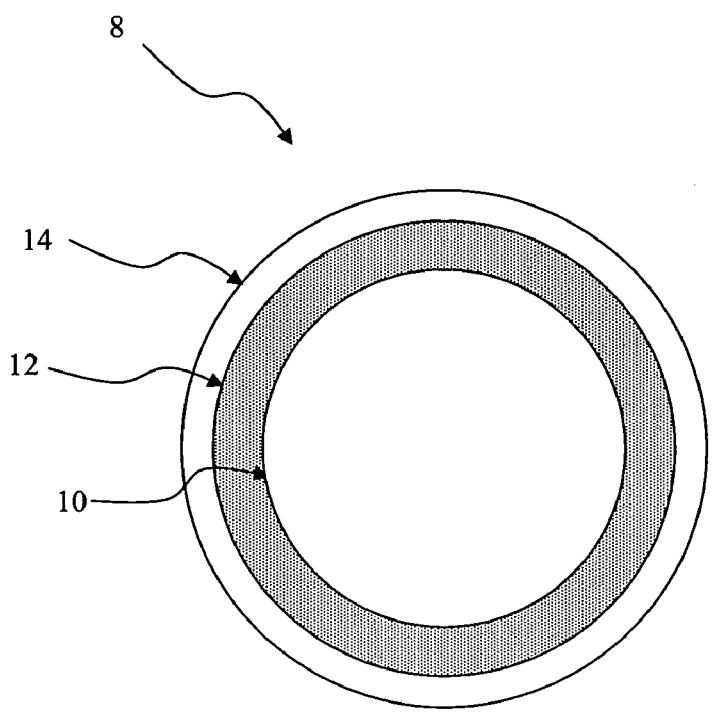
FIG. 2 is a cross-sectional view of a multi-component golf ball, wherein at least a portion of the golf ball is formed from the composition of the invention.
Figure 3:
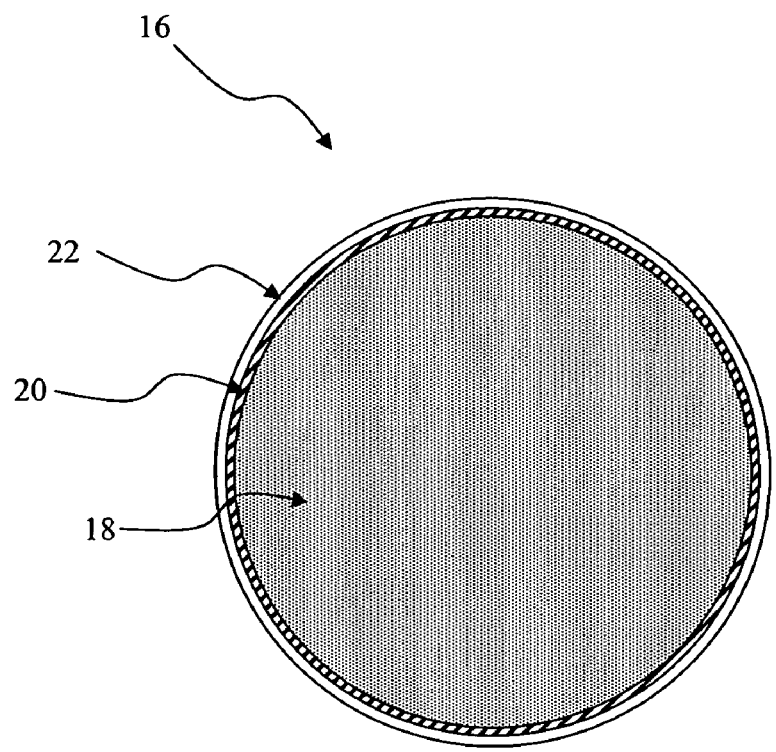
FIG. 3 is a cross-sectional view of a multi-component golf ball including a large core, an intermediate layer, and a thin outer cover layer disposed thereon, wherein at least a portion of the golf ball is formed from the composition of the invention.
Figure 4:
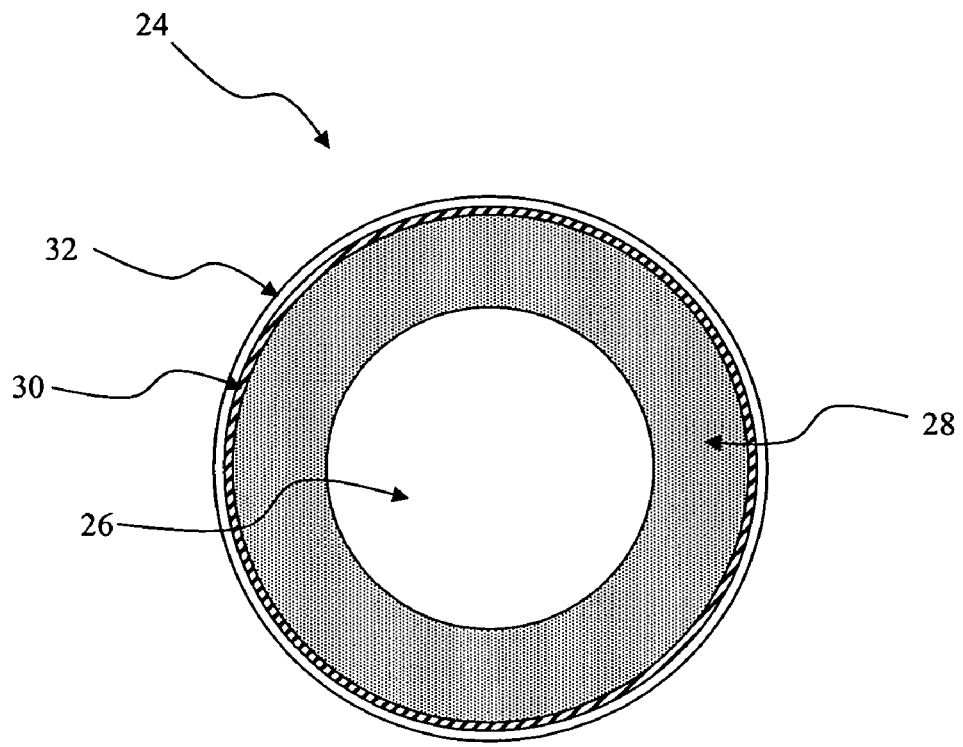
FIG. 4 is a cross-sectional view of a multi-component golf ball including a core, an outer core layer, a thin inner cover layer, and a thin outer cover layer disposed thereon, wherein at least a portion of the golf ball is formed from the composition of the invention.

In one embodiment, a golf ball 2 according to the invention (as shown in FIG. 1) includes a core 4 and a cover 6, wherein the at least one of core 4 and cover 6 incorporates at least one layer including the composition of the invention. Similarly, FIG. 2 illustrates a golf ball according to the invention incorporating an intermediate layer. Golf ball 8 includes a core 10, a cover 14, and an intermediate layer 12 disposed between the core 10 and cover 14. Any of the core 10, intermediate layer 12, or cover 14 may incorporate at least one layer that includes the compositions of the invention. FIG. 3 illustrates a multilayer golf ball 16 according to the invention including a large core 18, an outer core layer, intermediate layer, or inner cover layer 20, and an outer cover layer 22. Any of the core 18, outer core layer, intermediate layer, or inner cover layer 20, and outer cover layer 22 may include the composition of the invention. FIG. 4 shows a four-piece golf ball 24 according to the invention including a core 26, an outer core layer or intermediate layer 28, an inner cover layer 30, and an outer cover layer 32. Any of the core 26, outer core layer or intermediate layer 28, inner cover layer 30, and outer cover layer 32 may include the composition of the invention.

Other non-limiting examples of suitable types of ball constructions that may be used with the present invention include those described in U.S. Pat. Nos. 6,056,842, 5,688,191, 5,713,801, 5,803,831, 5,885,172, 5,919,100, 5,965,669, 5,981,654, 5,981,658, and 6,149,535, as well as in Publication Nos. US2001/0009310 A1, US2002/0025862, US2002/0028885, US2002/0151380. The entire disclosures of these patents and published patent applications are incorporated by reference herein. For example, in Publication No. US2002/015380, a golf ball having three or more cover layers is disclosed, of which any of the layers of the ball may be formed using the compositions of the invention. In addition, the compositions of the invention are contemplated for use in layers of the gradated hardness multilayer golf balls disclosed in U.S. Patent Publication No. 2001/0005699, which is incorporated by reference herein in its entirety.

As discussed, the golf balls of the invention include at least one structural layer that includes compositions of the invention. In addition, as discussed in more detail below, the golf balls of the invention may include core layers, intermediate layers, or cover layers formed from materials known to those of skill in the art. These examples are not exhaustive, as skilled artisans would be aware that a variety of materials might be used to produce a golf ball of the invention with desired performance properties.

Core Layer(s)

The cores of the golf balls formed according to the invention may be solid, semi-solid, hollow, fluid-filled, or powder filled, but are preferably solid and formed with the compositions of the invention. As used herein, the term "core" means the innermost portion of a golf ball, and may include one or more layers. For example, U.S. Pat. Nos. 6,180,040 and 6,180,722 disclose methods of preparing dual core golf balls. The entire disclosures of these patents are incorporated by reference herein. The term "semi-solid" as used herein refers to a paste, a gel, or the like. The cores of the golf balls of the invention may be spherical, cubical, pyramid-shaped, geodesic, or any three-dimensional, symmetrical shape.

While the cores of the invention may be formed with compositions of the invention, conventional materials may also be used to form the cores. Suitable core materials include, but are not limited to, thermoset materials, such as rubber, styrene butadiene, polybutadiene, isoprene, polyisoprene, trans-isoprene, and polyurethane, and thermoplastic materials, such as conventional ionomer resins, polyamides, polyesters, and polyurethane. In one embodiment, at least one layer of the core is formed from a polybutadiene reaction product, such as the reaction products disclosed in U.S. Patent Publication No. 2003/0119989, the entire disclosure of which is incorporated by reference herein.

The core may also include one or more wound layers (surrounding a fluid or solid center) including at least one tensioned elastomeric material wound about the center. In one embodiment, the tensioned elastomeric material includes natural or synthetic elastomers or blends thereof, in which the synthetic elastomer preferably includes LYCRA. The tensioned elastomeric material may also incorporate conventional polyisoprene, a polybutadiene reaction product, a polyurea composition, and/or solvent spun polyethers urea, as disclosed in co-pending U.S. Patent Publication Nos. 2003/0119989, 2003/0096936 and U.S. Pat. No. 6,149,535, which are incorporated in their entirety by reference herein.

In another aspect of the invention, the golf balls of the invention include a thin, highly filled core layer, such as the ones disclosed in U.S. Pat. No. 6,494,795, which is incorporated by reference herein in its entirety. A thin, highly filled core layer allows the weight or mass of the golf ball to be allocated radially relative to the centroid, thereby dictating the moment of inertia of the ball. When the weight is allocated radially toward the centroid, the moment of inertia is decreased, and when the weight is allocated outward away from the centroid, the moment of inertia is increased.

Intermediate Layer(s)

As used herein, "intermediate layer" includes any layer between the innermost layer of the golf ball and the outermost layer of the golf ball. Therefore, intermediate layers may also be referred to as outer core layers, inner cover layers, and the like. When the golf ball of the present invention includes an intermediate layer, this layer may be formed from the compositions of the invention.

The intermediate layer may also be formed of conventional materials known to those of ordinary skill in the art, including various thermoset and thermoplastic materials, as well as blends thereof. For example, the intermediate layer may be formed, at least in part, from one or more homopolymeric or copolymeric materials, such as vinyl resins, low and high acid ionomer resins, polyolefins, polyurethanes, polyureas, polyamides, acrylic resins, olefinic thermoplastic rubbers, block copolymers of styrene and butadiene, isoprene or ethylene-butylene rubber, copoly(ether-amide), polyphenylene oxide resins, thermoplastic polyesters, ethylene, propylene, 1-butene or 1-hexene based homopolymers or copolymers, and the like.

The intermediate layer may also be formed from highly neutralized polymers such as those disclosed U.S. Patent Publication Nos. 2001/0018375 and 2001/0019971, which are incorporated herein in their entirety by express reference thereto; grafted and non-grafted metallocene catalyzed polyolefins and polyamides, polyamide/ionomer blends, and polyamide/nonionomer blends, such as those disclosed in U.S Patent Publication No. 2003/0078348, which is incorporated by reference herein in its entirety; among other polymers. Examples of other suitable intermediate layer materials include blends of some of the above materials, such as those disclosed in U.S. Pat. No. 5,688,181, the entire disclosure of which is incorporated by reference herein.

The intermediate layer may also be a moisture barrier layer, such as the ones described in U.S. Pat. No. 5,820,488, which is incorporated in its entirety by reference herein.

Cover Layer(s)

The cover provides the interface between the ball and a club. As used herein, the term "cover" means the outermost portion of a golf ball. A cover typically includes at least one layer and may contain indentations such as dimples and/or ridges. Paints and/or laminates are typically disposed about the cover to protect the golf ball during use thereof. The cover may include a plurality of layers, e.g., an inner cover layer disposed about a golf ball center and an outer cover layer formed thereon.

Inner and/or outer cover layers may be formed from the compositions of the invention. Alternatively, both the inner and/or outer cover layers of golf balls of the present invention may be formed of polyurea, polyurethane, or mixtures thereof, as disclosed in co-pending U.S. Patent Publication Nos. 2003/0096936 and 2003/0212240. The entire disclosures of these publications are incorporated by reference herein.

In addition, cover layers may also be formed of one or more homopolymeric or copolymeric materials, such as vinyl resins, polyolefins, conventional polyurethanes and polyureas, such as the ones disclosed in U.S. Pat. Nos. 5,334,673, and 5,484,870, polyamides, acrylic resins and blends of these resins with poly vinyl chloride, elastomers, and the like, thermoplastic urethanes, olefinic thermoplastic rubbers, block copolymers of styrene and butadiene, polyphenylene oxide resins or blends of polyphenylene oxide with high impact polystyrene, thermoplastic polyesters, ethylene, propylene, 1-butene or 1-hexane based homopolymers or copolymers including functional monomers, methyl acrylate, methyl methacrylate homopolymers and copolymers, low acid ionomers, high acid ionomers, highly neutralized ionomers, alloys, and mixtures thereof. The cover may also be at least partially formed from a polybutadiene reaction product as disclosed in U.S. Patent Publication No. 2003/0119989.

As discussed above with respect to the core of the golf balls of the invention, the use of a thin, highly filled layer allows the weight or mass of the golf ball to be allocated radially relative to the centroid, thereby dictating the moment of inertia of the ball. This concept is translatable to the cover layers of a golf ball. Thus, the inner cover layer may be a thin, dense layer so as to form a high moment of inertia ball. In this aspect of the invention, the inner cover layer preferably has a specific gravity of greater than 1.2, more preferably more than 1.5, even more preferably more than 1.8, and most preferably more than 2.0. Suitable materials for the thin, dense layer include any material that meets the specific gravity stated above. For example, this thin, highly filled inner cover layer may be formed of the radiation-curable compositions of the invention, adjusting for the requisite specific gravity. Alternatively, the inner cover layer may be formed from epoxies, styrenated polyesters, polyurethanes or polyureas, liquid PBR's, silicones, silicate gels, agar gels, and the like.

Additional materials may be included in the core, intermediate layer, and/or cover layer compositions outlined above. For example, catalysts, coloring agents, optical brighteners, crosslinking agents, whitening agents such as $TiO_2$ and ZnO, UV absorbers, hindered amine light stabilizers, defoaming agents, processing aids, surfactants, and other conventional additives may be added to the cover layer compositions of the invention. In addition, antioxidants, stabilizers, softening agents, plasticizers, including internal and external plasticizers, impact modifiers, foaming agents, density-adjusting fillers, reinforcing materials, and compatibilizers may also be added to any of the cover layer compositions. Those of ordinary skill in the art should be aware of the requisite amount for each type of additive to realize the benefits of that particular additive.

Methods for Forming Golf Ball Components

The golf balls of the invention may be formed using a variety of application techniques such as compression molding, flip molding, injection molding, retractable pin injection molding, reaction injection molding (RIN), reinforced reaction injection molding (RRIM), retractable pin injection molding (RPIM), casting, vacuum forming, powder coating, flow coating, spin coating, dipping, spraying, and the like depending on the materials used for a specific component. For example, the compositions of the invention are particular useful in injection molding and extrusion applications. Thus, golf ball components including the compositions of the invention may be formed by injection molding and the like.

One skilled in the art, however, would appreciate that the molding method used may be determined at least partially by the properties of the composition used to form the particular golf ball component. For example, casting or RIM, may be preferred when the material is thermoset, whereas compression molding or injection molding may be preferred for thermoplastic compositions. Compression molding, however, may also be used for thermoset inner ball materials. For example, when cores are formed from a thermoset material, compression molding is a particularly suitable method of forming the core, whereas when the cores are formed of a thermoplastic material, the cores may be injection molded. In addition, the intermediate layer may also be formed from using any suitable method known to those of ordinary skill in the art. For instance, an intermediate layer may be formed by blow molding and covered with a dimpled cover layer formed by injection molding, compression molding, casting, vacuum forming, powder coating, and the like.

Because the compositions of the invention have improved heat resistance over conventional thermoplastic elastomers, high temperature processable materials may be molded over a layer formed of a composition including ETPV. For example, when an intermediate layer is formed of a composition of the invention, a cover layer may be disposed over the intermediate layer using RPIM, RIM, or other high temperature processable materials that would not normally be available for use due to the lower heat resistance of conventional thermoplastic elastomers and ionomers used in the intermediate layer.

Any inner layer of the golf balls of the invention may be surface treated prior to cover formation to further increase the adhesion between the outer surface of the inner ball and the cover. In addition, the outermost cover of the golf balls of the invention may be surface treated prior to application of any coating layer. Such surface treatment may include mechanically or chemically abrading the outer surface of the subassembly. Additionally, the inner ball may be subjected to corona discharge, plasma treatment, and/or silane dipping prior to forming the cover around it. Other layers of the ball, e.g., the core, also may be surface treated. Examples of these and other surface treatment techniques can be found in U.S. Pat. No. 6,315,915, which is incorporated by reference in its entirety.

The methods discussed herein and other manufacturing methods for forming the golf ball components of the present invention are also disclosed in U.S. Pat. Nos. 6,207,784 and 5,484,870, the disclosures of which are incorporated herein by reference in their entirety.

Dimples

The golf balls of the invention are preferably designed with certain flight characteristics in mind. The use of various dimple patterns and profiles provides a relatively effective-way to modify the aerodynamic characteristics of a golf ball. As such, the manner in which the dimples are arranged on the surface of the ball can be by any available method. For instance, the ball may have an icosahedron-based pattern, such as described in U.S. Pat. No. 4,560,168, or an octahedral-based dimple patterns as described in U.S. Pat. No. 4,960,281. Alternatively, the dimple pattern can be arranged according to phyllotactic patterns, such as described in U.S. Pat. No. 6,338,684, or a tubular lattice pattern, such as the one disclosed in U.S. Pat. No. 6,290,615, the disclosures of which are incorporated herein in their entirety.

Dimple patterns may also be based on Archimedean patterns including a truncated octahedron, a great rhombcuboctahedron, a truncated dodecahedron, and a great rhombicosidodecahedron, wherein the pattern has a non-linear parting line, as disclosed in U.S. patent application Ser. No. 10/078,417, which is incorporated in its entirety by reference herein. The golf balls of the present invention may also be covered with non-circular shaped dimples, i.e., amorphous shaped dimples, as disclosed in U.S. Pat. No. 6,409,615, which is incorporated in its entirety by reference herein.

Dimple patterns that provide a high percentage of surface coverage are preferred, and are well known in the art. For example, U.S. Pat. Nos. 5,562,552, 5,575,477, 5,957,787, 5,249,804, and 4,925,193 disclose geometric patterns for positioning dimples on a golf ball. In one embodiment, the golf balls of the invention have a dimple coverage of the surface area of the cover of at least about 60 percent, preferably at least about 65 percent, and more preferably at least 70 percent or greater. Dimple patterns having even higher dimple coverage values may also be used with the present invention. Thus, the golf balls of the present invention may have a dimple coverage of at least about 75 percent or greater, about 80 percent or greater, or even about 85 percent or greater.

The golf balls of the present invention may also have a plurality of pyramidal projections disposed on the intermediate layer of the ball, as disclosed in U.S. Pat. No. 6,383,092, which is incorporated in its entirety by reference herein. The plurality of pyramidal projections on the golf ball may cover between about 20 percent to about 80 of the surface of the intermediate layer. In an alternative embodiment, the golf ball may have a non-planar parting line allowing for some of the plurality of pyramidal projections to be disposed about the equator.

Several additional non-limiting examples of dimple patterns with varying sizes of dimples are also provided in U.S. Pat. Nos. 6,358,161 and 6,213,898, the entire disclosures of which are incorporated by reference herein.

The total number of dimples on the ball, or dimple count, may vary depending such factors as the sizes of the dimples and the pattern selected. In general, the total number of dimples on the ball preferably is between about 100 to about 1000 dimples, although one skilled in the art would recognize that differing dimple counts within this range can significantly alter the flight performance of the ball. In one embodiment, the dimple count is about 380 dimples or greater, but more preferably is about 400 dimples or greater, and even more preferably is about 420 dimples or greater. In one embodiment, the dimple count on the ball is about 422 dimples. In some cases, it may be desirable to have fewer dimples on the ball. Thus, one embodiment of the present invention has a dimple count of about 380 dimples or less, and more preferably is about 350 dimples or less.

Dimple profiles revolving a catenary curve about its symmetrical axis may increase aerodynamic efficiency, provide a convenient way to alter the dimples to adjust ball performance without changing the dimple pattern, and result in uniformly increased flight distance for golfers of all swing speeds. Thus, catenary curve dimple profiles, as disclosed in U.S. Patent Publication No. 2003/0114255, which is incorporated in its entirety by reference herein, is contemplated for use with the golf balls of the present invention.

Golf Ball Post-Processing

The golf balls of the present invention may be painted, coated, or surface treated for further benefits. For example, a golf ball of the invention may be treated with a base resin paint composition or the cover composition may contain certain additives to achieve a desired color characteristic. In one embodiment, the golf ball cover composition contains a fluorescent whitening agent to provide improved weather resistance and brightness. An example of such a fluorescent whitening agent is disclosed in U.S. Patent Publication No. 2002/0082358, which is incorporated by reference herein in its entirety.

Protective and decorative coating materials, as well as methods of applying such materials to the surface of a golf ball cover are well known in the golf ball art. Generally, such coating materials comprise urethanes, urethane hybrids, epoxies, polyesters and acrylics. If desired, more than one coating layer can be used. The coating layer(s) may be applied by any suitable method known to those of ordinary skill in the art. For example, the coating layer(s) may be applied to the golf ball cover by an in-mold coating process, such as described in U.S. Pat. No. 5,849,168, which is incorporated in its entirety by reference herein. The coating layer may have a thickness of about 0.004 inches or less, more preferably about 0.002 inches or less.

In addition, the golf balls of the invention may be painted or coated with an ultraviolet curable/treatable ink, by using the methods and materials disclosed in U.S. Pat. Nos. 6,500,495, 6,248,804, and 6,099,415, the entire disclosures of which are incorporated by reference herein.

Furthermore, trademarks or other indicia may be stamped, i.e., pad-printed, on the outer surface of the ball cover, and the stamped outer surface is then treated with at least one clear coat to give the ball a glossy finish and protect the indicia stamped on the cover.

The golf balls of the invention may also be subjected to dye sublimation, wherein at least one golf ball component is subjected to at least one sublimating ink that migrates at a depth into the outer surface and forms an indicia. The at least one sublimating ink preferably includes at least one of an azo dye, a nitroarylamine dye, or an anthraquinone dye. U.S. Patent Publication No. 2003/0106442, the entire disclosure of which is incorporated by reference herein.

Laser marking of a selected surface portion of a golf ball causing the laser light-irradiated portion to change color is also contemplated for use with the present invention. U.S. Pat. Nos. 5,248,878 and 6,075,223 generally disclose such methods, the entire disclosures of which are incorporated by reference herein. In addition, the golf balls may be subjected to ablation, i.e., directing a beam of laser radiation onto a portion of the cover, irradiating the cover portion, wherein the irradiated cover portion is ablated to form a detectable mark, wherein no significant discoloration of the cover portion results therefrom. Ablation is discussed in U.S. Pat. No. 6,462,303, which is incorporated in its entirety by reference herein.

Golf Ball Properties

The properties such as hardness, modulus, core diameter, and layer thickness of the golf balls of the present invention have been found to effect play characteristics such as spin, initial velocity and feel of the present golf balls. For example, the flexural and/or tensile modulus of the intermediate layer are believed to have an effect on the "feel" of the golf balls of the present invention. It should be understood that the ranges herein are meant to be intermixed with each other, i.e., the low end of one range may be combined with a high end of another range.

Component Dimensions

Dimensions of golf ball components, i.e., thickness and diameter, may vary depending on the desired properties. For the purposes of the invention, any layer thickness may be employed. Non-limiting examples of the various embodiments outlined above are provided here with respect to layer dimensions.

The present invention relates to golf balls of any size. While USGA specifications limit the size of a competition golf ball to more than 1.68 inches in diameter, golf balls of any size can be used for leisure golf play. The preferred diameter of the golf balls is from about 1.68 inches to about 1.8 inches. The more preferred diameter is from about 1.68 inches to about 1.76 inches. A diameter of from about 1.68 inches to about 1.74 inches is most preferred, however diameters anywhere in the range of from about 1.7 to about 1.95 inches can be used. Preferably, the overall diameter of the core and all intermediate layers is about 80 percent to about 98 percent of the overall diameter of the finished ball.

The core may have a diameter ranging from about 0.09 inches to about 1.65 inches. In one embodiment, the diameter of the core of the present invention is about 1.2 inches to about 1.630 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches.

The core of the golf ball may also be extremely large in relation to the rest of the ball. For example, in one embodiment, the core makes up about 90 percent to about 98 percent of the ball, preferably about 94 percent to about 96 percent of the ball. In this embodiment, the diameter of the core is preferably about 1.54 inches or greater, preferably about 1.55 inches or greater. In one embodiment, the core diameter is about 1.59 inches or greater. In another embodiment, the diameter of the core is about 1.64 inches or less.

When the core includes an inner core layer and an outer core layer, the inner core layer is preferably about 0.9 inches or greater and the outer core layer preferably has a thickness of about 0.1 inches or greater. In one embodiment, the inner core layer has a diameter from about 0.09 inches to about 1.2 inches and the outer core layer has a thickness from about 0.1 inches to about 0.8 inches. In yet another embodiment, the inner core layer diameter is from about 0.095 inches to about 1.1 inches and the outer core layer has a thickness of about 0.20 inches to about 0.03 inches.

The cover typically has a thickness to provide sufficient strength, good performance characteristics, and durability. The thickness of the outer cover layer may be from about 0.005 inches to about 0.100 inches, preferably about 0.007 inches to about 0.035 inches. In one embodiment, the cover thickness is from about 0.02 inches to about 0.35 inches. In another embodiment, the cover preferably has a thickness of about 0.02 inches to about 0.12 inches, preferably about 0.1 inches or less, more preferably about 0.07 inches or less. In yet another embodiment, the outer cover has a thickness from about 0.02 inches to about 0.07 inches. In still another embodiment, the cover thickness is about 0.05 inches or less, preferably from about 0.02 inches to about 0.05 inches. For example, the outer cover layer may be between about 0.02 inches and about 0.045 inches, preferably about 0.025 inches to about 0.04 inches thick. In one embodiment, the outer cover layer is about 0.03 inches thick.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the invention, the intermediate layer, or inner cover layer, may have a thickness about 0.3 inches or less. In one embodiment, the thickness of the intermediate layer is from about 0.002 inches to about 0.1 inches, preferably about 0.01 inches or greater. In one embodiment, the thickness of the intermediate layer is about 0.09 inches or less, preferably about 0.06 inches or less. In another embodiment, the intermediate layer thickness is about 0.05 inches or less, more preferably about 0.01 inches to about 0.045 inches. In one embodiment, the intermediate layer, thickness is about 0.02 inches to about 0.04 inches. In another embodiment, the intermediate layer thickness is from about 0.025 inches to about 0.035 inches. In yet another embodiment, the thickness of the intermediate layer is about 0.035 inches thick. In still another embodiment, the inner cover layer is from about 0.03 inches to about 0.035 inches thick. Varying combinations of these ranges of thickness for the intermediate and outer cover layers may be used in combination with other embodiments described herein.

The ratio of the thickness of the intermediate layer to the outer cover layer is preferably about 10 or less, preferably from about 3 or less. In another embodiment, the ratio of the thickness of the intermediate layer to the outer cover layer is about 1 or less.

Hardness

Most golf balls consist of layers having different hardnesses, e.g., hardness gradients, to achieve desired performance characteristics. The present invention contemplates golf balls having hardness gradients between layers, as well as those golf balls with layers having the same hardness.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

The cores of the present invention may have varying hardnesses depending on the particular golf ball construction. In one embodiment, the core hardness is at least about 15 Shore A, preferably about 30 Shore A, as measured on a formed sphere. In another embodiment, the core has a hardness of about 50 Shore A to about 90 Shore D. In yet another embodiment, the hardness of the core is about 80 Shore D or less. Preferably, the core has a hardness about 30 to about 65 Shore D, and more preferably, the core has a hardness about 35 to about 60 Shore D.

The intermediate layer(s) of the present invention may also vary in hardness depending on the specific construction of the ball. In one embodiment, the hardness of the intermediate layer is about 30 Shore D or greater. In another embodiment, the hardness of the intermediate layer is about 90 Shore D or less, preferably about 80 Shore D or less, and more preferably about 70 Shore D or less. In yet another embodiment, the hardness of the intermediate layer is about 50 Shore D or greater, preferably about 55 Shore D or greater. In one embodiment, the intermediate layer hardness is from about 55 Shore D to about 65 Shore D. The intermediate layer may also be about 65 Shore D or greater.

When the intermediate layer is intended to be harder than the core layer, the ratio of the intermediate layer hardness to the core hardness preferably about 2 or less. In one embodiment, the ratio is about 1.8 or less. In yet another embodiment, the ratio is about 1.3 or less.

As with the core and intermediate layers, the cover hardness may vary depending on the construction and desired characteristics of the golf ball. The ratio of cover hardness to inner ball hardness is a primary variable used to control the aerodynamics of a ball and, in particular, the spin of a ball. In general, the harder the inner ball, the greater the driver spin and the softer the cover, the greater the driver spin.

For example, when the intermediate layer is intended to be the hardest point in the ball, e.g., about 50 Shore D to about 75 Shore D, the cover material may have a hardness of about 20 Shore D or greater, preferably about 25 Shore D or greater, and more preferably about 30 Shore D or greater, as measured on the slab. In another embodiment, the cover itself has a hardness of about 30 Shore D or greater. In particular, the cover may be from about 30 Shore D to about 70 Shore D. In one embodiment, the cover has a hardness of about 40 Shore D to about 65 Shore D, and in another embodiment, about 40 Shore to about 55 Shore D. In another aspect of the invention, the cover has a hardness less than about 45 Shore D, preferably less than about 40 Shore D, and more preferably about 25 Shore D to about 40 Shore D. In one embodiment, the cover has a hardness from about 30 Shore D to about 40 Shore D.

In this embodiment when the outer cover layer is softer than the intermediate layer or inner cover layer, the ratio of the Shore D hardness of the outer cover material to the intermediate layer material is about 0.8 or less, preferably about 0.75 or less, and more preferably about 0.7 or less. In another embodiment, the ratio is about 0.5 or less, preferably about 0.45 or less.

In yet another embodiment, the ratio is about 0.1 or less when the cover and intermediate layer materials have hardnesses that are substantially the same. When the hardness differential between the cover layer and the intermediate layer is not intended to be as significant, the cover may have a hardness of about 55 Shore D to about 65 Shore D. In this embodiment, the ratio of the Shore D hardness of the outer cover to the intermediate layer is about 1.0 or less, preferably about 0.9 or less.

In another embodiment, the cover layer is harder than the intermediate layer. In this design, the ratio of Shore D hardness of the cover layer to the intermediate layer is about 1.33 or less, preferably from about 1.14 or less.

In addition, the present invention also contemplates the compositions of the invention being used in a golf ball with multiple cover layers having essentially the same hardness, wherein at least one of the layers has been modified in some way to alter a property that affects the performance of the ball. Such ball constructions are disclosed in co-pending U.S. patent application Ser. No. 10/167,744, filed Jun. 13, 2002, entitled "Golf Ball with Multiple Cover Layers," the entire disclosure of which is incorporated by reference herein.

Compression

Compression values are dependent on the diameter of the component being measured. Atti compression is typically used to measure the compression of a golf ball. As used herein, the terms "Atti compression" or "compression" are defined as the deflection of an object or material relative to the deflection of a calibrated spring, as measured with an Atti Compression Gauge, that is commercially available from Atti Engineering Corp. of Union City, N.J.

The Atti compression of the core, or portion of the core, of golf balls prepared according to the invention is preferably less than about 80, more preferably less than about 75. In another embodiment, the core compression is from about 40 to about 80, preferably from about 50 to about 70. In yet another embodiment, the core compression is preferably below about 50, and more preferably below about 25. In an alternative, low compression embodiment, the core has a compression less than about 20, more preferably less than about 10, and most preferably, 0. As known to those of ordinary skill in the art, however, the cores generated according to the present invention may be below the measurement of the Atti Compression Gauge.

In one embodiment, golf balls of the invention preferably have an Atti compression of about 55 or greater, preferably from about 60 to about 120. In another embodiment, the Atti compression of the golf balls of the invention is at least about 40, preferably from about 50 to 120, and more preferably from about 60 to 100. In yet another embodiment, the compression of the golf balls of the invention is about 75 or greater and about 95 or less. For example, a preferred golf ball of the invention may have a compression from about 80 to about 95.

Initial Velocity and COR

There is currently no USGA limit on the COR of a golf ball, but the initial velocity of the golf ball cannot exceed 250±5 feet/second (ft/s). Thus, in one embodiment, the initial velocity is about 245 ft/s or greater and about 255 ft/s or greater. In another embodiment, the initial velocity is about 250 ft/s or greater. In one embodiment, the initial velocity is about 253 ft/s to about 254 ft/s. In yet another embodiment, the initial velocity is about 255 ft/s. While the current rules on initial velocity require that golf ball manufacturers stay within the limit, one of ordinary skill in the art would appreciate that the golf ball of the invention would readily convert into a golf ball with initial velocity outside of this range. For example, a golf ball of the invention may be designed to have an initial velocity of about 220 ft/s or greater, preferably about 225 ft/s or greater.

As a result, of the initial velocity limitation set forth by the USGA, the goal is to maximize COR without violating the 255 ft/s limit. The COR of a ball is measured by taking the ratio of the outbound or rebound velocity to the incoming or inbound velocity. In a one-piece solid golf ball, the COR will depend on a variety of characteristics of the ball, including its composition and hardness. For a given composition, COR will generally increase as hardness is increased. In a two-piece solid golf ball, e.g., a core and a cover, one of the purposes of the cover is to produce a gain in COR over that of the core. When the contribution of the core to high COR is substantial, a lesser contribution is required from the cover. Similarly, when the cover contributes substantially to high COR of the ball, a lesser contribution is needed from the core.

The present invention contemplates golf balls having CORs from about 0.700 to about 0.850 at an inbound velocity of about 125 ft/sec. In one embodiment, the COR is about 0.750 or greater, preferably about 0.780 or greater. In another embodiment, the ball has a COR of about 0.800 or greater. In yet another embodiment, the COR of the balls of the invention is about 0.800 to about 0.815.

Spin Rate

As known to those of ordinary skill in the art, the spin rate of a golf ball will vary depending on the golf ball construction. In a multilayer ball, e.g., a core, an intermediate layer, and a cover, wherein the cover is formed from the compositions of the invention, the spin rate of the ball off a driver ("driver spin rate") may be 1500 rpm or greater. In one embodiment, the driver spin rate is about 2000 rpm to about 3500 rpm. In another embodiment, the driver spin rate is about 2200 rpm to about 3400 rpm. In still another embodiment, the driver spin rate may be less than about 1500 rpm.

Two-piece balls made according to the invention may also have driver spin rates of 1500 rpm and greater. In one embodiment, the driver spin rate is about 2000 rpm to about 3300 rpm. Wound balls made according to the invention preferably have similar spin rates.

Methods of determining the spin rate should be well understood by those of ordinary skill in the art. Examples of methods for determining the spin rate are disclosed in U.S. Pat. Nos. 6,500,073, 6,488,591, 6,286,364, and 6,241,622, which are incorporated by reference herein in their entirety.

Flexural Modulus

Accordingly, it is preferable that the golf balls of the present invention have an intermediate layer with a flexural modulus of about 500 psi to about 500,000 psi according to ASTM D-6272-98. More preferably, the flexural modulus of the intermediate layer is about 1,000 psi to about 250,000 psi. Most preferably, the flexural modulus of the intermediate layer is about 2,000 psi to about 200,000 psi.

The flexural modulus of the cover layer is preferably about 2,000 psi or greater, and more preferably about 5,000 psi or greater. In one embodiment, the flexural modulus of the cover is from about 10,000 psi to about 150,000 psi. More preferably, the flexural modulus of the cover layer is about 15,000 psi to about 120,000 psi. Most preferably, the flexural modulus of the cover layer is about 18,000 psi to about 110,000 psi. In another embodiment, the flexural modulus of the cover layer is about 100,000 psi or less, preferably about 80,000 or less, and more preferably about 70,000 psi or less. For example, the flexural modulus of the cover layer may be from about 10,000 psi to about 70,000 psi, from about 12,000 psi to about 60,000 psi, or from about 14,000 psi to about 50,000 psi.

In one embodiment, when the cover layer has a hardness of about 50 Shore D to about 60 Shore D, the cover layer preferably has a flexural modulus of about 55,000 psi to about 65,000 psi.

In one embodiment, the ratio of the flexural modulus of the intermediate layer to the cover layer is about 0.003 to about 50. In another embodiment, the ratio of the flexural modulus of the intermediate layer to the cover layer is about 0.006 to about 4.5. In yet another embodiment, the ratio of the flexural modulus of the intermediate layer to the cover layer is about 0.11 to about 4.5.

In one embodiment, the compositions of the invention are used in a golf ball with multiple cover layers having essentially the same hardness, but differences in flexural moduli. In this aspect of the invention, the difference between the flexural moduli of the two cover layers is preferably about 5,000 psi or less. In another embodiment, the difference in flexural moduli is about 500 psi or greater. In yet another embodiment, the difference in the flexural moduli between the two cover layers, wherein at least one is reinforced is about 500 psi to about 10,000 psi, preferably from about 500 psi to about 5,000 psi. In one embodiment, the difference in flexural moduli between the two cover layers formed of unreinforced or unmodified materials is about 1,000 psi to about 2,500 psi.

Specific Gravity

The specific gravity of a cover or intermediate layer is preferably at least about 0.7. In one embodiment, the specific gravity of the intermediate layer or cover is about 0.8 or greater, preferably about 0.9 or greater. For example, in one embodiment, the golf ball has an intermediate layer with a specific gravity of about 0.9 or greater and a cover having a specific gravity of about 0.95 or greater. In another embodiment, the intermediate layer or cover has a specific gravity of about 1.00 or greater. In yet another embodiment, the specific gravity of the intermediate layer or cover is about 1.05 or greater, preferably about 1.10 or greater. In still another embodiment, the specific gravity of the intermediate layer or cover is about 1.0 to about 1.3.

The core may have a specific gravity of about 1.00 or greater, preferably 1.05 or greater. For example, a golf ball of the invention may have a core with a specific gravity of about 1.10 or greater and a cover with a specific gravity of about 0.95 or greater.

EXAMPLES

The following non-limiting examples are merely illustrative of the preferred embodiments of the present invention, and are not to be construed as limiting the invention, the scope of which is defined by the appended claims. Parts are by weight unless otherwise indicated.

Example 1

Composition of the Invention

A golf ball formed according to the invention may have a polybutadiene core, an intermediate layer formed from a composition of the invention, and a cover formed from a polyurethane material. The core may be a conventional solid construction including a cis-1,4 polybutadiene rubber that has been cross-linked with a metal salt of an unsaturated fatty acid such as zinc diacrylate may be used to create a core.

The intermediate layer may be formed from a composition including an ETPV of the invention formed from a mixture of ethylene/methacrylic acid rubber and 25 percent thermoplastic polyester elastomer (Hytrel® 5526). Three suitable (non-limiting) ETPVs are provided below. Such materials are commercially available from DuPont.

| Material | ETPV #1 | ETPV #2 | ETPV #3 |
|---|---|---|---|
| Hardness (15 seconds, Shore A) | 60 | 80 | 90 |
| Density (23° C., g/cm³) | 1.08 | 1.10 | 1.12 |
| Tensile Strength (23° C., MPa) | 5 | 7.8 | 9 |
| Strain at break (23° C., %) | 185 | 123 | 122 |
| Tear Strength (23° C., kN/m) | 16 | — | 29 |
| Compression 168 hrs at 23° C. (%) | 32 | — | 43 |
| set 22 hrs at 100° C. (%) | 40 | — | 59 |

The ETPV is then cured with a curative as set forth in Table 2 below;

TABLE 2

| | Peroxide | | Coagent | | Shore A |
|---|---|---|---|---|---|
| Example | Type | Wt % of rubber | Type | Wt % of rubber | hardness (material) |
| 1 | 2,5-dimethyl- | 2 | Diethylene glycol | 3.85 | 59 |
| 2 | 2,5-di-(t- | 2.5 | diacrylate | 5.66 | 63 |
| 3 | butylperoxy)hexyne-3 | 2 | Diethylene glycol | 3.85 | 60 |
| 4 | | 2.5 | dimethacrylate | 5.66 | 62 |
| 5 | | 2 | N,N'-m-phenylene | 1.96 | 65 |
| 6 | | 2.5 | dimaleimide | 3.85 | 65 |
| 7 | | 2 | Triallylisocyanurate | 1.96 | 66 |
| 8 | | 2.5 | | 3.85 | 69 |
| 9 | | 2.5 | Ethylene glycol dimethacrylate | 2.9 | 64 |
| 10 | | 2.5 | Diethylene glycol dimethacrylate | 3.5 | 65 |
| 11 | | 2.5 | Polyethylene glycol (200) dimethacrylate | 4.8 | 64 |
| 12 | | 2.5 | Diethylene glycol dimethacrylate | 3.5 | 64 |
| 13 | t-butylperoxybenzoate | 0.75 | Diethylene glycol | 3.85 | — |
| 14 | | 1.5 | diacrylate | 5.66 | 63 |
| 15 | | 0.75 | Diethylene glycol | 3.85 | — |
| 16 | | 1.5 | dimethacrylate | 5.66 | — |
| 17 | | 0.75 | N,N'-m-phenylene | 1.96 | 64 |
| 18 | | 1.5 | dimaleimide | 3.85 | 69 |
| 19 | | 0.75 | Triallylisocyanurate | 1.96 | — |
| 20 | | 1.5 | | 3.85 | 68 |

The inner ball construction may then be covered using conventional compression molding, or injection molding or casting techniques with a cover formulation containing a thermoplastic silicone-urethane copolymer of the invention by using a one-shot method or pre-polymer approach. For example, the method may include preparing a prepolymer formed from a polyol or polyamine and an isocyanate and curing the prepolymer with an amine-terminated or hydroxyl-terminated component to form a cover composition with urethane linkages, urea linkages, or a combination thereof. This composition is then disposed over the intermediate layer to form a golf ball. The cover may be between about 0.05 and 0.10 inches thick.

Other than in the examples, or unless otherwise expressly specified, all of the numerical ranges, amounts, values and percentages such as those for amounts of materials, times and temperatures of reaction, ratios of amounts, values for molecular weight (whether number average molecular weight ("Mn") or weight average molecular weight ("Mw"), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

The invention described and claimed herein is not to be limited in scope by the specific embodiments herein disclosed, since these embodiments are intended as illustrations of several aspects of the invention. Any equivalent embodiments are intended to be within the scope of this invention. For example, the compositions of the invention may also be used in golf equipment such as putter inserts, golf club heads and portions thereof, golf shoe portions, and golf bag portions. Indeed, various modifications of the invention in addition to those shown and described herein will become apparent to those skilled in the art from the foregoing description. Such modifications are also intended to fall within the scope of the appended claims. All patents and patent applications cited in the foregoing text are expressly incorporate herein by reference in their entirety.

What is claimed is:

1. A golf ball comprising at least one layer formed of a composition comprising:
    a blend comprising:
        thermoplastic component comprising a polyalkylene phthalate polyester polymer, polyalkylene phthalate polyester copolymer, or mixture thereof; and
        a rubber component comprising a crosslinkable polyacrylate vulcanizate rubber, a polyethylene acrylate vulcanizate rubber, polymethacrylate vulcanizate rubber, a polyethylene methacrylate vulcanizate rubber or a combination thereof,
    a free radical initiator; and
    a coagent comprising an organic diene.

2. The golf ball of claim 1, wherein the thermoplastic component comprises a polyalkylene phthalate polyester copolymer comprising a polyether polyester having at least one segment of polybutylene terephthalate and at least one segment of long chain polyether glycols.

3. The golf ball of claim 2, wherein the thermoplastic component is selected from the group consisting of polyalkylene terephthalate, polyether ester of polyalkylene terephthalate, polyalkylene terephthalate copolymer, polyether ester of polyalkylene terephthalate copolymer, and mixtures thereof.

4. The golf ball of claim 1, wherein the organic diene comprises diethylene glycol diacrylate, diethylene glycol dimethacrylate, N,N'-m-phenylene dimaleimide, triallylisocyanurate, trimethylolpropane trimethacrylate, tetraallyloxyethane, triallylisocyanurate, tetramethylene diacrylate, polyethylene glycol dimethacrylate, or mixtures thereof.

5. The golf ball of claim 1, wherein the free radical initiator comprises 2,5-dimethyl-2,5-di-(t-butylperoxy) hexyne-3, t-butyl peroxybenzoate, 2,5-dimethyl-2,5-di-(t-butylperoxy)-2,5-dimethylhexane, dicumyl peroxide, a,a-bis(t-butylperoxy)-2,5-dimethylhexane, and mixtures thereof.

6. The golf ball of claim 1, wherein the thermoplastic component is present in an amount of about 15 to about 65 weight percent of the blend.

7. The golf ball of claim 1, wherein the rubber component is present in an amount of about 35 to 85 weight percent of the blend.

8. The golf ball of claim 1, wherein the golf ball comprises a core, a cover layer, and an intermediate layer disposed between the core and the cover, and wherein the intermediate layer comprises the composition.

9. A golf ball comprising a core, a cover, and an intermediate layer disposed between the core and the cover, wherein the intermediate layer is formed of a first composition comprising:
    a blend comprising:
        about 15 to 65 percent by weight of the blend of a thermoplastic component comprising a polyalkylene phthalate polyester polymer, polyalkylene phthalate polyester copolymer, or mixture thereof;
        about 35 to 85 percent by weight of the blend of a rubber component comprising a polyacrylate elastomer, a polyethylene acrylate elastomer, a polymethacrylate elastomer, a polyethylene methacrylate elastomer or a mixture thereof,
    a curative comprising:
        a free radical initiator; and
        a coagent, and
    wherein the cover is formed of a second composition comprising polyurethane linkages, polyurea linkages, or a combination thereof.

10. The golf ball of claim 9, wherein the second composition consists of urea linkages.

11. The golf ball of claim 9, wherein the thermoplastic component is present in an amount of about 20 to 60 percent by weight of the blend and the rubber component is present in an amount of about 40 percent to 80 percent by weight of the blend.

12. The golf ball of claim 9, wherein the coagent comprises an organic diene.

13. The golf ball of claim 12, wherein the organic diene is selected from the group consisting of diethylene glycol diacrylate, diethylene glycol dimethacrylate, N,N'-m-phenylene dimaleimide, triallylisocyanurate, trimethylolpropane trimethacrylate, tetraallyloxyethane, triallylisocyanurate, tetramethylene diacrylate, polyethylene glycol dimethacrylate, and mixtures thereof.

14. The golf ball of claim 9, wherein the first composition has a hardness of about 55 Shore A to 60 Shore D.

15. A method of making a golf ball comprising:
    forming a core;
    forming an intermediate layer disposed about the core by:
        forming a blend comprising a thermoplastic component comprising a polyalkylene phthalate polyester polymer, polyalkylene phthalate polyester copolymer, or mixture thereof with a rubber component comprising a crosslinkable polyacrylate vulcanizate rubber, a polyethylene acrylate vulcanizate rubber, polymethacrylate vulcanizate rubber, a polyethylene methacrylate vulcanizate rubber or a combination thereof, forming a curative comprising a free radical initiator and a coagent comprising an organic diene;

mixing the blend and curative to a composition and forming the composition into an intermediate layer; and forming a cover disposed about the intermediate layer.

16. The method of claim 15, wherein the step of forming the intermediate layer comprises extruding the composition.

17. The method of claim 15, wherein the step of forming the intermediate layer comprises injection molding the composition.

18. The method of claim 17, wherein the molding temperature is about 45° C. to 65° C.

19. The method of claim 17, wherein melt temperature is about 240° C. to 260° C.

* * * * *